United States Patent [19]

Merrifield et al.

[11] Patent Number: 5,762,395
[45] Date of Patent: Jun. 9, 1998

[54] MOLDED CROSS CAR SUPPORT STRUCTURE

[75] Inventors: Richard Allen Merrifield, Spring Valley; Douglas Allen Randall, Fairborn, both of Ohio

[73] Assignee: General Motors Corporation, Detroit, Mich.

[21] Appl. No.: 670,133

[22] Filed: Jun. 25, 1996

[51] Int. Cl.⁶ .................. B62D 25/14; B60H 1/28
[52] U.S. Cl. .................. 296/203; 296/208; 296/901; 180/90; 454/127; 454/152
[58] Field of Search .................. 296/70, 72, 192, 296/194, 203, 205, 208, 901; 180/90; 454/69, 127, 152

[56] References Cited

U.S. PATENT DOCUMENTS

| | | | |
|---|---|---|---|
| 3,724,357 | 4/1973 | Kavthekar et al. | 454/152 |
| 4,391,465 | 7/1983 | Piano | 296/208 |
| 4,413,840 | 11/1983 | Shah | 280/784 |
| 4,559,868 | 12/1985 | Nonaka et al. | 454/127 |
| 4,646,879 | 3/1987 | Mahler et al. | 180/90 |
| 4,898,764 | 2/1990 | Kurihara et al. | 428/188 |
| 5,088,571 | 2/1992 | Burry et al. | 180/90 |
| 5,154,462 | 10/1992 | Carpenter | 293/120 |
| 5,311,960 | 5/1994 | Kukainis et al. | 180/90 |
| 5,354,114 | 10/1994 | Kelman et al. | 296/192 |
| 5,358,300 | 10/1994 | Gray | 296/192 |
| 5,364,159 | 11/1994 | Kelman et al. | 296/192 |
| 5,487,800 | 1/1996 | Ash | 156/87 |

*Primary Examiner*—Andrew C. Pike
*Attorney, Agent, or Firm*—Kathryn A. Marra

[57] ABSTRACT

A cross car support structure of an instrument panel assembly is provided for attachment to the vehicle side structure. The cross car support structure includes a one-piece, integrally molded beam preferably made entirely of plastic, the plastic beam having first and second opposing ends connected to the vehicle side structure. In addition, the beam includes a plurality of laterally extending, upwardly opening, U-shaped duct channels having upwardly facing edges. The cross car support further includes an instrument panel cover including a substrate layer having a bottom surface. The bottom surface of the substrate layer of the instrument panel cover is continuously secured to the upwardly facing edges of the beam so that the continuously secured instrument panel cover interconnects the upwardly facing edges and stiffens the beam such that the beam and the continuously secured instrument panel cover cooperatively provide the entire cross car support structure for the instrument panel assembly.

10 Claims, 2 Drawing Sheets

MOLDED CROSS CAR SUPPORT STRUCTURE

This invention relates to a cross car support structure for an instrument panel assembly in a vehicle.

BACKGROUND OF THE INVENTION

It is known in the prior art to provide cross car support structure for an instrument panel assembly in a vehicle. The typical cross car support structure must support many instrument panel components, such as steering wheels, air bag modules, and HVAC systems. Traditionally, most cross car support structures include a metal beam made of stamped steel or cast magnesium. It has also been suggested to provide cross car beams having composite compositions or plastic compositions reinforced with metal. When mainly plastic or composite-type cross car beams have been employed, they are typically composed of several pieces which have very complex shapes and which are stacked together and attached in a complicated manner to provide sufficient strength or require additional metal cross beams or mounting brackets. Also in the prior art, the typical cross car beams require separate duct work for HVAC systems adding more parts to the assembly. In addition, the prior art cross car support structures require the instrument panel assembly to include a separate decorative top cover which is intermittently attached to the cross car support structure, such as by screws or other traditional fasteners.

SUMMARY OF THE INVENTION

Advantageously, this invention provides a cross car support structure of an instrument panel having a cross car beam which is preferably made entirely of plastic, such that the cross car support structure is lightweight. In addition, the beam has a relatively simple shape which is easy to manufacture and mold. Also advantageously, duct channels for the HVAC system are integrally formed with the shape of the beam such that separate duct channels are not needed. Furthermore, the instrument panel cover is used as a key structural portion of the cross car support structure and the size and geometry of the instrument panel cover provides substantial stiffness to the cross car support structure so that, together with the single one-piece beam, the entire cross car support structure including the duct channels is provided without the use of heavy metal cross beams, additional metal support brackets, or complex-shaped, multiple layers of plastic members.

These advantages are accomplished in a preferred form of the present invention by providing a cross car support structure of an instrument panel assembly for attachment to the vehicle side structure. The cross car support structure includes a one-piece, integrally molded beam preferably made entirely of plastic, the beam having at least one end connected to the vehicle side structure. In addition, the beam includes a plurality of laterally extending, upwardly opening, U-shaped duct channels preferably lying in a same generally horizontal plane. The duct channels each include a rearward generally vertical wall and a forward generally vertical wall with the duct channels sharing one of the generally vertical walls therebetween such that one of the forward generally vertical walls of one of the duct channels provides one of the rearward generally vertical walls for another of the duct channels. Preferably, the duct channels include a rearward primary air duct for carrying heated, cooled, and ambient air to vehicle occupants, a forward defroster duct, and a side window defogger duct positioned between the rearward primary air duct and the defroster duct.

In accordance with another preferred aspect of the invention, each of the generally vertical walls of the duct channels of the beam includes upwardly facing edges. The cross car support structure further includes an instrument panel cover including a substrate layer having a bottom surface. The bottom surface of the substrate layer of the instrument panel cover is continuously secured to the upwardly facing edges of the beam so that the continuously secured instrument panel cover interconnects the upwardly facing edges and stiffens the beam such that the beam and the continuously secured instrument panel cover cooperatively provide the entire cross car support structure for the instrument panel assembly. The bottom surface of the substrate layer of the instrument panel cover is continuously secured to preferably the substantially entire surface of the upwardly facing edges such as by adhesively bonding or vibration welding.

In accordance with another preferred aspect of the invention, the substrate layer of the instrument panel cover is L-shaped and includes a generally horizontal upper portion and an integrally formed downwardly extending lower portion. In one embodiment, only the generally horizontal upper portion of the instrument panel cover is continuously secured to the upwardly facing edges of the beam for ease of assembly. The lower portion of the instrument panel cover may also be continuously secured to forwardly facing edges of the duct channels of the beam.

Advantageously, the invention provides a cross car support structure which is lightweight, which greatly reduces the number and complexity of components, which has a high degree of dimensional accuracy, which is easy to manufacture, and which has reduced tooling and assembly costs compared with cross car support structures of the prior art.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
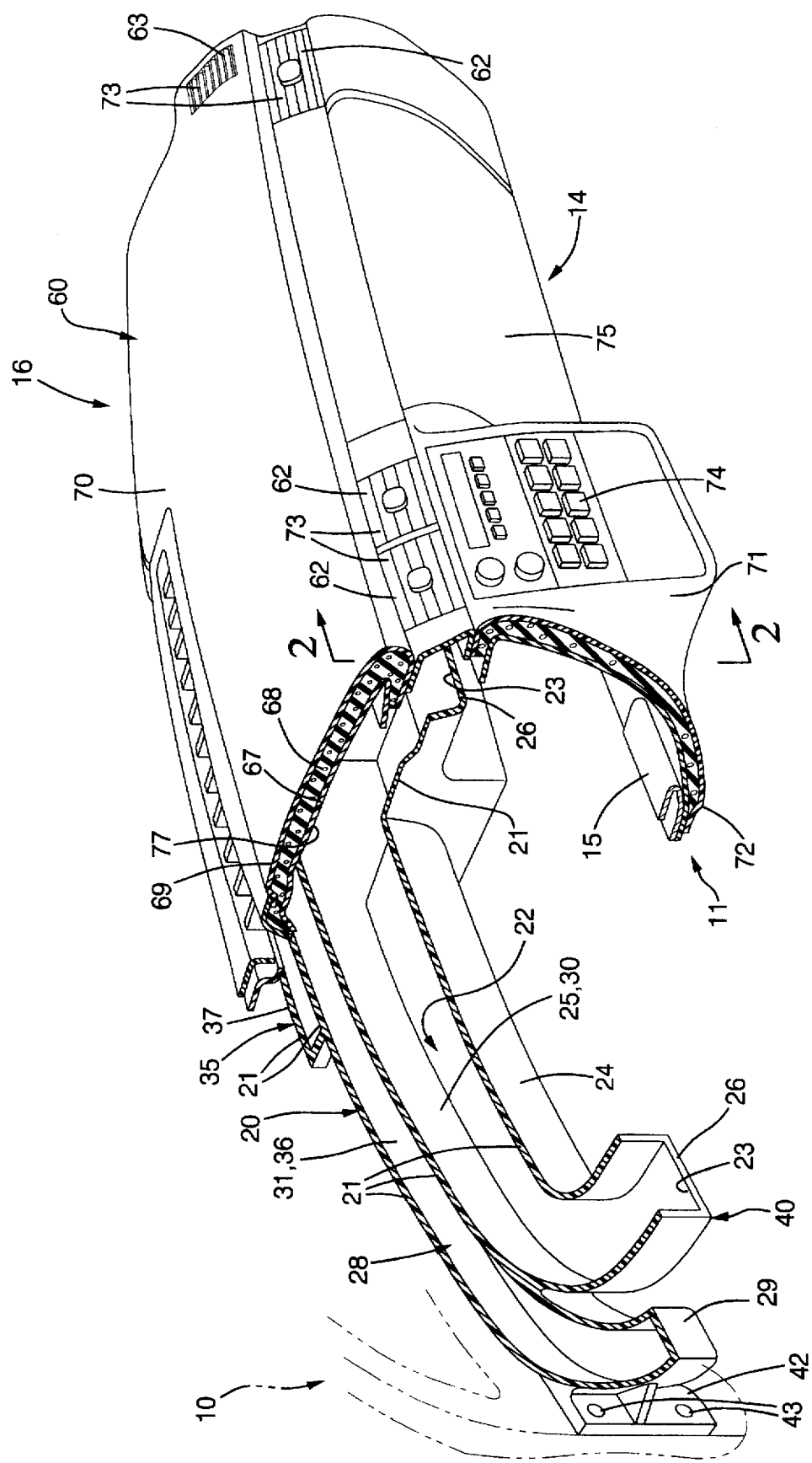
FIG. 1 is a perspective view of the cross car support structure for an instrument panel assembly with the instrument panel cover partially broken away.
Figure 2:
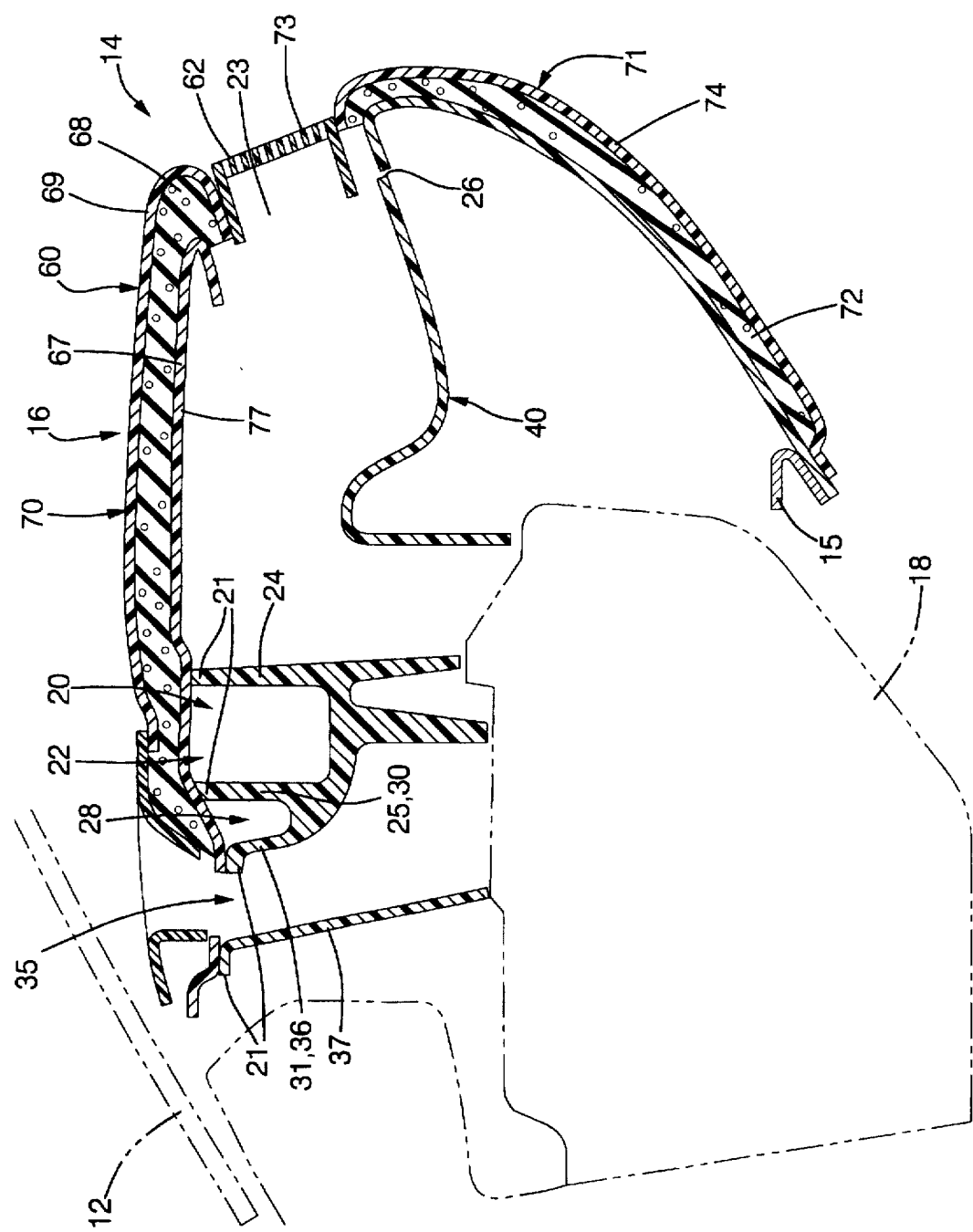
FIG. 2 is a sectional view taken along line 2—2 of FIG. 1.

A typical passenger vehicle includes vehicle side structure 10, such as the A-pillar structure, which defines the forward portion of an interior passenger compartment 11. The interior passenger compartment 11 includes an instrument panel assembly 14 which is positioned forward of the occupants (not shown). The instrument panel assembly 14 includes cross car support structure 16 on which numerous interior components are mounted and supported, such as HVAC system components 18, a steering wheel (not shown), and air bag modules (not shown) through the use of suitable brackets and fasteners (not shown). The entire cross car support structure 16 and duct channels 20 for an HVAC system are advantageously provided by a single plastic beam 40 continuously joined to an instrument panel cover 60, as will now be described.

The beam 40 preferably is one-piece and integrally molded preferably entirely of plastic material. Preferably the plastic material has a flexural modulus of at least 800,000 psi. The plastic beam 40 has opposite flanged ends 42 for connection to the vehicle side structure 10 on opposite sides of the vehicle. The flanged ends 42 each preferably includes end apertures 43 through which fasteners can be received to secure the ends 42 of the plastic beam 40 to the vehicle side structure 10. It will further be appreciated that the ends 42 of the plastic beam 40 may also be attached to the vehicle side structure 10 in other suitable manners, such as bonding or welding.

Advantageously, the duct channels 20 for the HVAC system are integrally molded with the plastic beam 40 to greatly reduce the number of components in the instrument panel assembly 14. Accordingly, the plastic beam 40 includes a plurality of upwardly opening, U-shaped duct channels 20. The duct channels 20 preferably lie in the generally same horizontal plane and are generally lined up forward and rearward of each other. The duct channels 20 extend laterally across the vehicle between the flanged ends 42 and have individual lateral lengths as needed.

Preferably, the plastic beam 40 includes three duct channels being a rearward primary air first duct 22, a forward defroster third duct 35, and a side window defogger second duct 28 positioned between the first duct 22 and the third duct 35. It will be appreciated that the third duct 35 is preferably shorter and centrally located to accomplish its objective of defrosting a vehicle windshield 12. The first duct 22 preferably includes central and curved end outlets 23 directed towards the vehicle occupants for matably aligning with first vented openings 62 in the instrument panel cover 60 for delivering heated, cooled, or ambient air to the vehicle occupants. The outlets 23 define forwardly facing edges 26 which may also be continuously secured to the instrument panel cover 60, as described hereinafter. The second duct 28 preferably has closed curved ends 29 matably aligned with upper second vented openings 63 in the instrument panel cover 60 located to accomplish the objective of defrosting side windows (not shown). However, it will be appreciated that these specific duct channels 20 and functions may be interchangeable between the forward and rearward positions and that additional duct channels 20 may be added or duct channels 20 with other purposes in the HVAC system may be added or subtracted. For example, the third duct 35 could be provided as a separate piece. However, it is very desirable that at least two duct channels 20 extend laterally across the vehicle and be integrally formed with the plastic beam 40. The integral vertical height and the integral horizontal forward-to-rearward order of the plurality of duct channels 20 provides the geometry and stiffness needed for the cross car support structure 16. In addition, the duct channels 20 preferably lie in generally the same horizontal plane next to each other so that there is a horizontal surface comprised of upwardly facing edges 21 of the duct channels 20 for convenient continuous attachment of the plastic beam 40 to the instrument panel cover 60, as described hereinafter.

The first duct channel 22 includes a first rearward generally vertical wall 24 and a first forward generally vertical wall 25. The second duct channel 28 includes a second rearward generally vertical wall 30 and a second forward generally vertical wall 31. The third duct channel 35 includes a third rearward generally vertical wall 36 and a third forward generally vertical wall 37. It will be appreciated that the first forward generally vertical wall 25 also provides the second rearward generally vertical wall 30 and that the second forward generally vertical wall 31 also provides the third rearward generally vertical wall 36. Thus, each of duct channels 20 shares one of the generally vertical walls 25, 30, 31, 36 therebetween such that one of the forward generally vertical walls 25, 31 of one of the duct channels 20 provides one of the rearward generally vertical walls 30, 36 for another of the duct channels 20 to reduce the number of components and increase stiffness of the plastic beam 40.

Each of the generally vertical walls 24, 25, 30, 31, 36, 37 of the duct channels 20 of the plastic beam 40 includes upwardly facing edges 21 which preferably lie in a generally horizontal plane. Substantially the entire surface area of the upwardly facing edges 21 is preferably continuously secured to the instrument panel cover 60 to cooperatively provide the cross car support structure 16, as described further below.

The cross car support structure 16 further includes the instrument panel cover 60. The instrument panel cover 60 includes a structural substrate layer 67 made of a relatively stiff plastic material, an overlying foam layer 68, and an outer skin layer 69. It will be appreciated that the foam and skin layers 68, 69 are decorative and could be eliminated such that the substrate layer 67 made of a material such as an injection molded thermoplastic could serve as both the substrate layer 67 and the decorative outer surface.

The instrument panel cover 60 and the corresponding substrate layer 67 are preferably L-shaped and include a generally horizontal upper portion 70 and an integrally formed downwardly extending lower portion 71. The substrate layer 67 is integrally molded of a plastic material generally into the L-shape with suitable openings for features such as vents 73, a console 74, and a glove box 75.

A bottom surface 77 of the generally horizontal upper portion 70 of the substrate layer 67 is generally planar for abutting and engaging substantially the entire surface of the upwardly facing edges 21 of the duct channels 20 for continuous attachment thereto. The bottom surface 77 of the substrate layer 67 of the instrument panel cover 60 is continuously secured to the upwardly facing edges 21 of the plastic beam 40 wherein the continuously secured instrument panel cover 60 interconnects the upwardly facing edges 21 and stiffens the plastic beam 40 such that the plastic beam 40 and the continuously secured instrument panel cover 60 cooperatively provide the entire cross car support structure 16 for the instrument panel assembly 10.

Preferably this continuous attachment of the plastic beam 40 to the substrate layer 67 of the instrument panel cover 60 is accomplished by adhesive bonding, by vibration welding, by infrared welding, by hot plate welding or by any other suitable attachment methods that will integrally connect the majority of or the entire surface area of the upwardly facing edges 21 of the plastic beam 40 with the bottom surface 77 of the substrate layer 67 instrument panel cover 60. The plastic beam 40 and the substrate layer 67 of the instrument panel cover 60 are continuously joined by any method which continuously connects or melts them together so that the plastic beam 40 and instrument panel cover 60 act as a single cross car support structure 16. The instrument panel cover 60 and plastic beam 40 must be sufficiently continuously joined to cooperatively act as a single cross car support structure 16 having a sufficiently large size and geometry to generate a high moment of inertia and stiffness for providing sufficient torsional rigidity to the vehicle. It will be appreciated that preferably only the upper portion 70 of the instrument panel cover 60 is continuously secured to the plastic beam 40. However, the substrate layer 67 on the lower portion 71 of the instrument panel cover 60 may also be continuously secured to the forwardly facing edges 26 of the duct channels 20 of the plastic beam 40 for additional rigidity. Optionally, a lower edge 72 of the lower portion 70 of the instrument panel cover 60 may be anchored to any suitable vehicle structure, such as a lower tie bar 15.

It will be understood that a person skilled in the art may make modifications to the preferred embodiment shown herein within the scope and intent of the claims. For example, although the instrument panel cover 60 is shown as a one-piece cover having an integrally molded L-shaped substrate layer 67, it will be appreciated that the generally horizontal upper portion 70 of the instrument panel cover 60 may be formed separately and secured to the downwardly extending lower portion 71 to form the L-shaped instrument panel cover 60. While the beam 40 is most preferably integrally molded entirely of a plastic material, it will be appreciated that the beam 40 having upwardly facing edges 21 could also be one-piece integrally molded of other lightweight composite-type or lightweight metallic materials, such as aluminum or magnesium, with the instrument panel cover 60 continuously secured thereto.

While the present invention has been described as carried out in a specific embodiment thereof, it is not intended to be limited thereby but is intended to cover the invention broadly within the scope and spirit of the claims.

what is claimed is:

1. A cross car support structure of an instrument panel assembly for attachment to side structure of a vehicle, the cross car support structure comprising:

a one-piece, integrally molded beam made entirely of plastic, the plastic beam having at least one end connected to the vehicle side structure and extending laterally across the vehicle, the plastic beam including a plurality of laterally extending, upwardly opening, U-shaped duct channels, all of the duct channels lying in a same generally horizontal plane forward to rearward of each other, the duct channels each including a rearward generally vertical wall and a forward generally vertical wall, each of the duct channels sharing one of the generally vertical walls therebetween such that one of the forward generally vertical walls of one of the duct channels provides one of the rearward generally vertical walls for another of the duct channels the plastic beam having an overall vertical height substantially the same as a vertical height of a highest one of the forward and rearward generally vertical walls.

2. The cross car support structure of claim 1 wherein the duct channels consist of a rearward first duct, a forward third duct, and a second duct positioned between the rearward first duct and the forward third duct.

3. The cross car support structure of claim 1 wherein every one of the generally vertical walls of the duct channels of the plastic beam includes upwardly facing edges all lying entirely in a same horizontal plane and spaced apart from each other in a longitudinal direction and wherein the cross car structure further includes an instrument panel cover being formed separate from the plastic beam and being an outermost layer of the instrument panel assembly, the instrument panel cover including a substrate layer having a bottom surface including a generally planar, horizontal upper portion lying in the same generally horizontal plane as the upwardly facing edges, the bottom surface of the substrate layer of the instrument panel cover being continuously secured in the same generally horizontal plane to all of the upwardly facing edges of the plurally of the duct channels of the plastic beam wherein the continuously secured instrument panel cover interconnects the upwardly facing edges of the duct channels and stiffens the plastic beam such that the plastic beam and the continuously secured instrument panel cover cooperatively provide the cross car support structure including the plurality of the duct channels for the instrument panel assembly.

4. The cross car support structure of claim 3 wherein the bottom surface of the substrate layer of the instrument panel cover is adhesively bonded to the upwardly facing edges of the plastic beam.

5. The cross car support structure of claim 3 wherein the bottom surface of the substrate layer of the instrument panel cover is vibration welded to the upwardly facing edges of the plastic beam.

6. The cross car support structure of claim 3 wherein the substrate layer of the instrument panel cover is L-shaped and includes the generally planar, horizontal upper portion and a downwardly extending lower portion.

7. The cross car support structure of claim 6 wherein at least one of the duct channels includes forwardly facing edges and wherein the lower portion of the instrument panel cover is continuously secured to the forwardly facing edges.

8. A cross car support structure of an instrument panel assembly for attachment to vehicle side structure, the cross car support structure comprising:

a one-piece, integrally molded beam, the beam having at least one end connected to the vehicle side structure, the beam including a plurality of laterally extending, upwardly opening, U-shaped duct channels, all of the duct channels lying in a same generally horizontal plane and aligned forward to rearward of each other, all of the duct channels including a rearward generally vertical wall and a forward generally vertical wall, each of the duct channels sharing one of the generally vertical walls therebetween such that one of the forward generally vertical walls of one of the duct channels provides one of the rearward generally vertical walls for another of the duct channels, the beam having an overall vertical height substantially the same as a vertical height of a highest one of the forward and rearward generally vertical walls.

9. The cross car support structure of claim 8 wherein the duct channels consist of a rearward first duct, a forward third duct, and a second duct positioned between the rearward first duct and the forward third duct.

10. The cross car support structure of claim 8 wherein each of the generally vertical walls of the duct channels of the beam includes upwardly facing edges lying entirely in a same generally horizontal plane and wherein the cross car structure further includes an instrument panel cover being formed separate from the beam and being an outermost layer of the instrument panel assembly, the instrument panel cover including a substrate layer having a generally planar, horizontal upper portion including a bottom surface, the bottom surface of the substrate layer of the instrument panel cover being continuously secured along the same generally horizontal plane to the upwardly facing edges of the beam wherein the continuously secured instrument panel cover interconnects all of the upwardly facing edges and stiffens the beam such that the beam and the continuously secured instrument panel cover cooperatively provide the cross car support structure for the instrument panel assembly.

* * * * *

UNITED STATES PATENT AND TRADEMARK OFFICE
CERTIFICATE OF CORRRECTION

PATENT NO.   : 5,762,395
DATED        : June 9, 1998
INVENTOR(S)  : Richard Allen Merrifield, Spring Valley ; Douglas Allen
               Randall, Fairborn, both of Ohio It is certified that error appears in the above-identified patent and that said Letters Patent is hereby corrected as shown below:

On the title page , insert the following :

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 7 | 0 | 9 | 6 | 0 | 1 | 1/98 | Heck | 454 | 121 | |

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 2 | 3 | 8 | 3 | 8 | 0 | 0 | 10/78 | France | | | | |
| | | 2 | 5 | 4 | 1 | 9 | 5 | 8 | 9/84 | France | | | | |
| | | 2 | 6 | 2 | 3 | 7 | 7 | 6 | 6/89 | France | | | | |

Signed and Sealed this

Fourth Day of May, 1999

Attest:

Attesting Officer

Q. TODD DICKINSON

Acting Commissioner of Patents and Trademarks